Oct. 17, 1939.  J. LUPO, JR  2,176,676

THREAD CUTTING MACHINE

Filed April 28, 1937  4 Sheets-Sheet 1

INVENTOR.
JOSEPH LUPO, JR.
BY
Clark & Ott
ATTORNEYS

Oct. 17, 1939.   J. LUPO, JR   2,176,676
THREAD CUTTING MACHINE
Filed April 28, 1937   4 Sheets-Sheet 2

INVENTOR.
JOSEPH LUPO, JR.
BY
Clark Ott
ATTORNEYS

Oct. 17, 1939.  J. LUPO, JR  2,176,676
THREAD CUTTING MACHINE
Filed April 28, 1937  4 Sheets-Sheet 3

INVENTOR.
JOSEPH LUPO, JR
BY
Clark + Ott
ATTORNEYS

Oct. 17, 1939.   J. LUPO, JR   2,176,676
THREAD CUTTING MACHINE
Filed April 28, 1937   4 Sheets-Sheet 4

INVENTOR.
JOSEPH LUPO, JR.
BY Clark + Ott
ATTORNEYS

Patented Oct. 17, 1939

2,176,676

UNITED STATES PATENT OFFICE 2,176,676

THREAD CUTTING MACHINE

Joseph Lupo, Jr., Bronx, N. Y.

Application April 28, 1937, Serial No. 139,419

4 Claims. (Cl. 10—154)

This invention relates to a thread cutting machine which is especially designed for cutting either internal or external threads in articles made of synthetic resin or other synthetic plastics, although the same may be utilized on soft alloy metals, such as aluminum, copper, brass or the like.

Broadly, the invention comprehends an improved thread cutting machine which is so constructed and arranged as to effectually and cleanly cut threads at a high rate of speed without gumming or chipping, ripping, burning or otherwise marring the stock being cut.

As a further feature the invention provides a machine which is readily adjustable to vary the depth, pitch, shape and number of convolutions of the thread to be cut and the location of the thread either on the inner or outer periphery of the stock, while the cutting tool functions to automatically free itself of the cuttings.

More specifically the invention resides in a thread cutting machine embodying a tool continuously rotated at a high rate of speed and axially fed across the periphery of the stock which is supported and continuously rotated and wherein the tool, after the completion of the thread cutting operation, is automatically moved out of contact with the stock and withdrawn to retracted position to afford a clearance for the manual removal of the threaded stock and the emplacement of a new piece of stock in the machine.

Other objects of the invention are to provide a machine of the indicated character which is not unduly complicated in its construction, which is extremely simple in its mode of operation and which is highly efficient for its intended purpose.

With the above enumerated and other objects in view, reference is now made to the following specification and the accompanying drawings in which there is disclosed, by way of example, a preferred embodiment of the invention, while the claims are intended to cover variations and modifications which fall within the scope of the invention.

Figure 1:
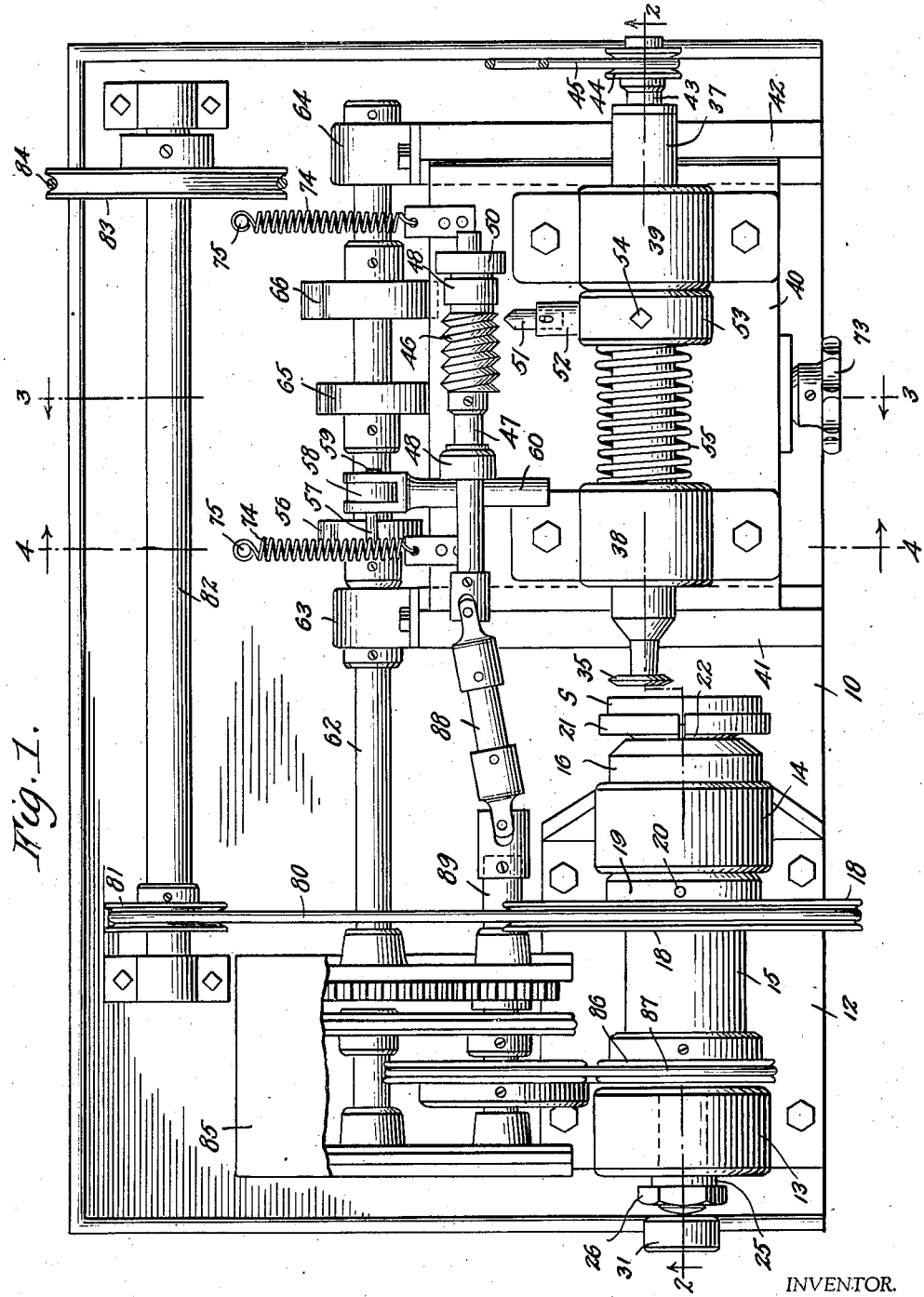
Fig. 1 is a top plan view of a threading machine constructed in accordance with the invention.

Referring to the drawings by characters of reference, 10 designates the base or table of the machine which is preferably supported in elevated relation to the floor by legs 11 and which has secured in fixed relation thereon, adjacent one side and near the front thereof, a bracket 12 having superposed aligned bearings 13 and 14.

A hollow cylindrical sleeve 15 is journaled in the aligned bearings 13 and 14 for rotation and is provided at its inner end with an enlarged head 16 having an inwardly flared or frusto-conical chuck engaging face 17. A pulley 18 for rotating the sleeve has its hub 19 surrounding the sleeve 15 and secured thereto by a set screw 20, the hub 19 and head 16 being disposed on opposite sides of the bearing 14 to prevent axial movement of the sleeve while permitting rotation thereof.

A stock supporting chuck 21 of the split resilient type is mounted for axial movement with reference to the sleeve 15 and is provided with a frusto-conical boss 22 adapted when moved outwardly into engagement with the frusto-conical chuck-engaging face 17 to effect an inward radial contraction and gripping of the stock S and is adapted to inherently expand radially outward when moved inwardly so as to release the stock S. The outer end portion 23 of the chuck is detachably associated with a shaft 24 extending axially through the sleeve 15 and carrying adjacent its outer end a collar 25 adjustably retained in place thereon by a nut 26. The sleeve, adjacent its inner end, is provided with an internal annular shoulder 27 constituting a spring seat against which is seated one end of a coiled expansion spring 28 which surrounds the shaft 24 and which engages at its outer end with the collar 25. This functions to normally effect an outward movement and inward radial contraction of the chuck 21 to grip and retain the stock S after its emplacement therein.

In order to provide means for manually shifting the shaft 24 and chuck 21 inwardly against the action of the spring to release one piece of stock and insert a new piece, a lever 29 is fulcrumed as at 30 for swinging movement of its upper end 31 into engagement with the outer end of the shaft 24 and suitable foot operated means 32 is connected with the lower end of said lever for actuating the same.

A driven rotary disk-like thread cutting tool 35 having its axis of rotation disposed in a line parallel with the line of the axis of rotation of the stock holder or chuck 21 is mounted for axial movement across the periphery of the stock. As illustrated, the tool is detachably associated with a drive shaft 36 mounted for rotation in a tubular housing 37 which housing is axially slidable in spaced aligned bearings 38 and 39 secured to and projecting upwardly from a carriage 40. The carriage 40 is movable laterally and in a direction perpendicular to the axis of rotation of the tool on spaced guide cleats 41 and 42 fixed to the base or table 10 near the front thereof and adjacent the side opposite that where the bracket 12 is located.

The outer end 43 of the shaft 36 protrudes beyond the housing and has secured thereto a pulley 44 around which is trained a belt 45 for rotating the shaft 36 and tool 35 at a high rate of speed, approximately 4000 R. P. M.

The tool is fed across the periphery of the stock S by means of a worm feed wheel 46 which is secured to a worm shaft 47 journaled for rotation in the upper ends of a pair of spaced bearing arms 48 which arms are secured at their lower ends to a rock shaft 49 journaled in upstanding bearings 50 on the carriage 40 adjacent the rear thereof.

A worm finger 51 is mounted for limited axial sliding movement in a tubular boss 52 which projects radially from a collar 53 arranged in surrounding relation to and upon the tubular housing 37 and secured thereon against axial movement by a set screw 54, the collar 53 being located on the tubular housing between the bearings 38 and 39. A coiled expansion spring 55 surrounds the housing 37 and is interposed between the bearing 38 and the collar 53 to exert a tension for normally moving the housing 37, tool shaft 36 and tool 35 to retracted position when the worm wheel 46 is disengaged from the worm finger 51. The worm finger 51 is normally urged outwardly to the limit of its movement by a spring which tensions the same against axial inward movement to provide a resilient engaging contact of the worm and worm finger. The worm wheel 46 is moved into and out of engagement with the worm finger 51 by swinging of the bearing arms 48 which action is imparted thereto by means of a rotary cam 56 which engages a cam roller 57 on a bifurcated lift bar 58 which has pivoted as at 59 to its upper end, a thrust rod 60 extending through a yoke 61 on one of the bearing arms 48. The cam 56 is secured to a cam shaft 62 which is journaled for rotation in bearings 63 and 64 secured to the rear of the guide cleats 41 and 42. The cam shaft has also secured thereto a pair of cams 65 and 66 which are adapted to be selectively employed for controlling the transverse movement of the carriage 40, their selective use being dependent upon whether or not the thread is being cut in the outer or inner periphery of the stock S.

A cam roller 67 is journaled for rotation in bearing ears 68 depending from the rear end of thrust bar 69 located transversely beneath the carriage 40 in spaced yokes 70. The thrust bar 69 is formed with a threaded longitudinally extending bore 71 engaged by a jack screw 72 which protrudes forwardly from and is swiveled to the carriage and provided at its forward end with a manipulating knob 73 by virtue of which relative adjustment of the carriage 40 with reference to the thrust bar 69 and cam wheel 67 may be effected. Coiled contractile springs 74 are attached to the rear of the carriage 40 and to rearwardly spaced anchoring pins 75 fixed to and upstanding from the base or table 10 adjacent the rear thereof.

The stock holder or chuck 21 is rotated at approximately 60 R. P. M. by means of a belt 80 trained around the pulley 18 and around a pulley 81 on a countershaft 82 which is turned by means of a pulley 83 secured thereto and around which a belt 84 is trained leading from a suitable prime mover not shown. Motion is transmitted to the cam shaft 62 and to the worm shaft 47 through gearing in a gear box 85 which may, as illustrated, be operated from the sleeve 15 through a pulley and belt drive 86 and 87. In order to compensate for the rocking movement of the worm feed shaft 47, a flexible or universal joint 88 is interposed between the worm feed shaft 47 and the drive shaft 89 from the gearing in the gear box 85.

Figure 2:
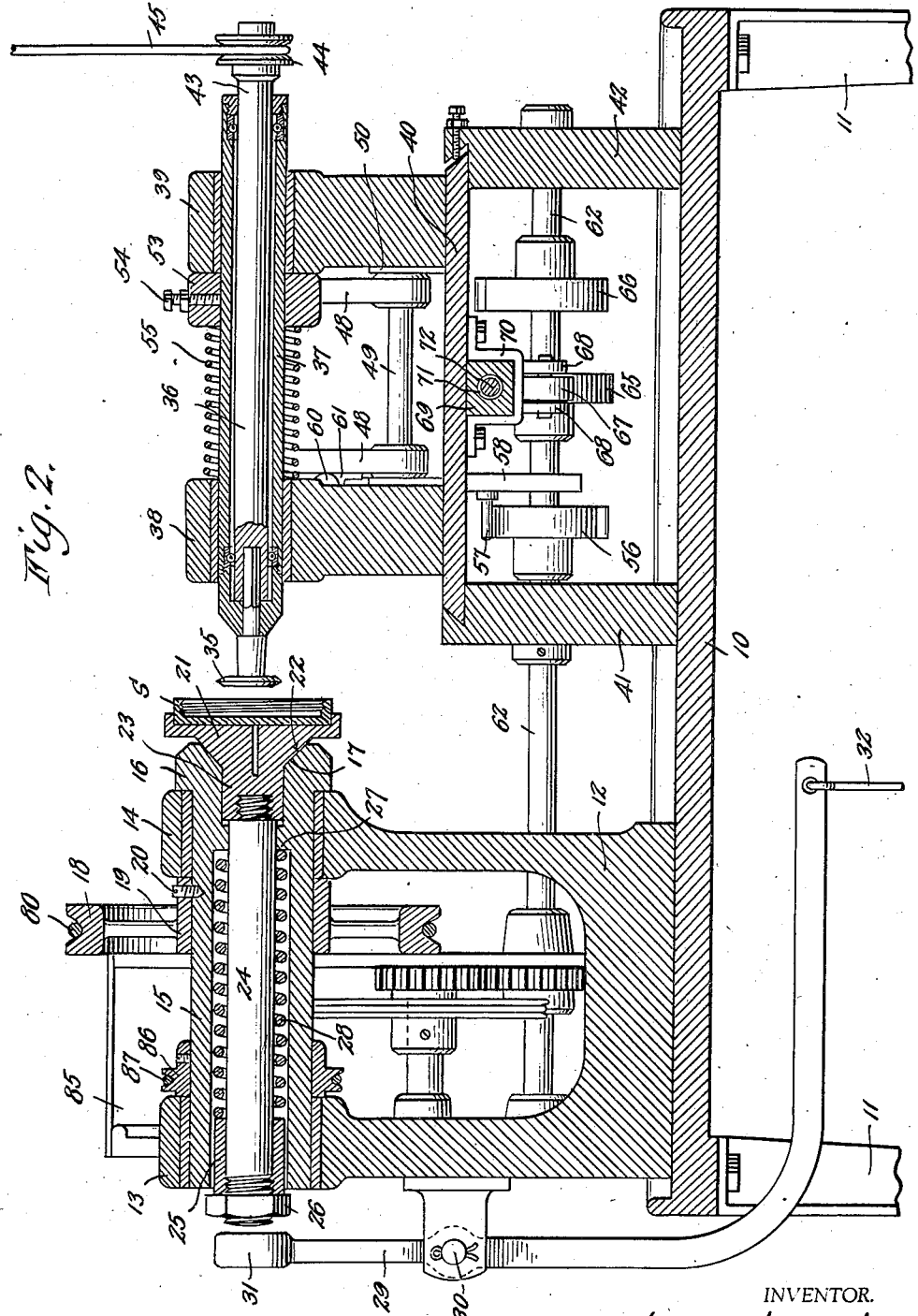
Fig. 2 is a longitudinal sectional view taken approximately on the line 2—2 of Fig. 1.
Figure 3:
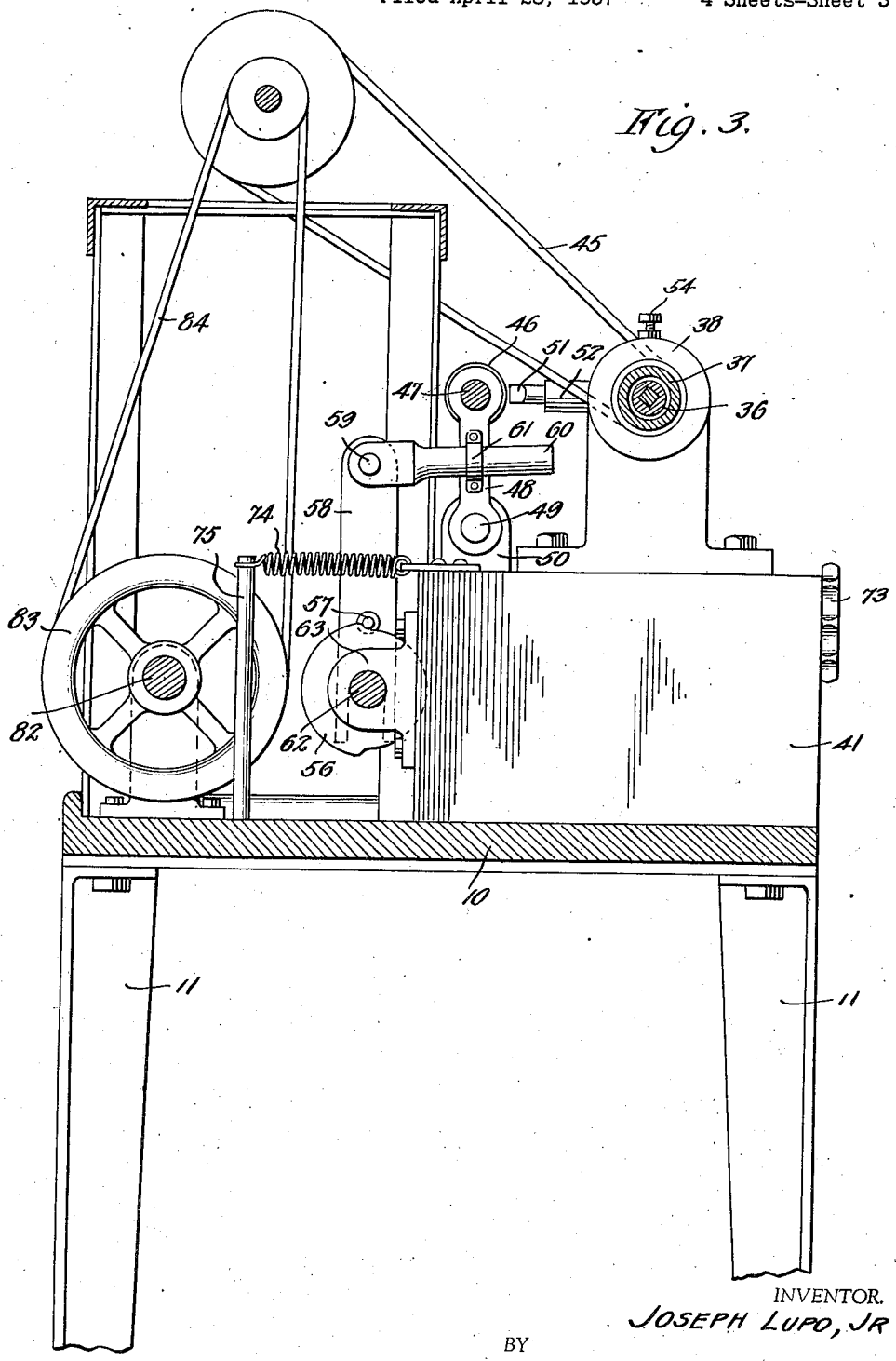
Fig. 3 is a transverse sectional view taken approximately on the line 3—3 of Fig. 1.
Figure 4:
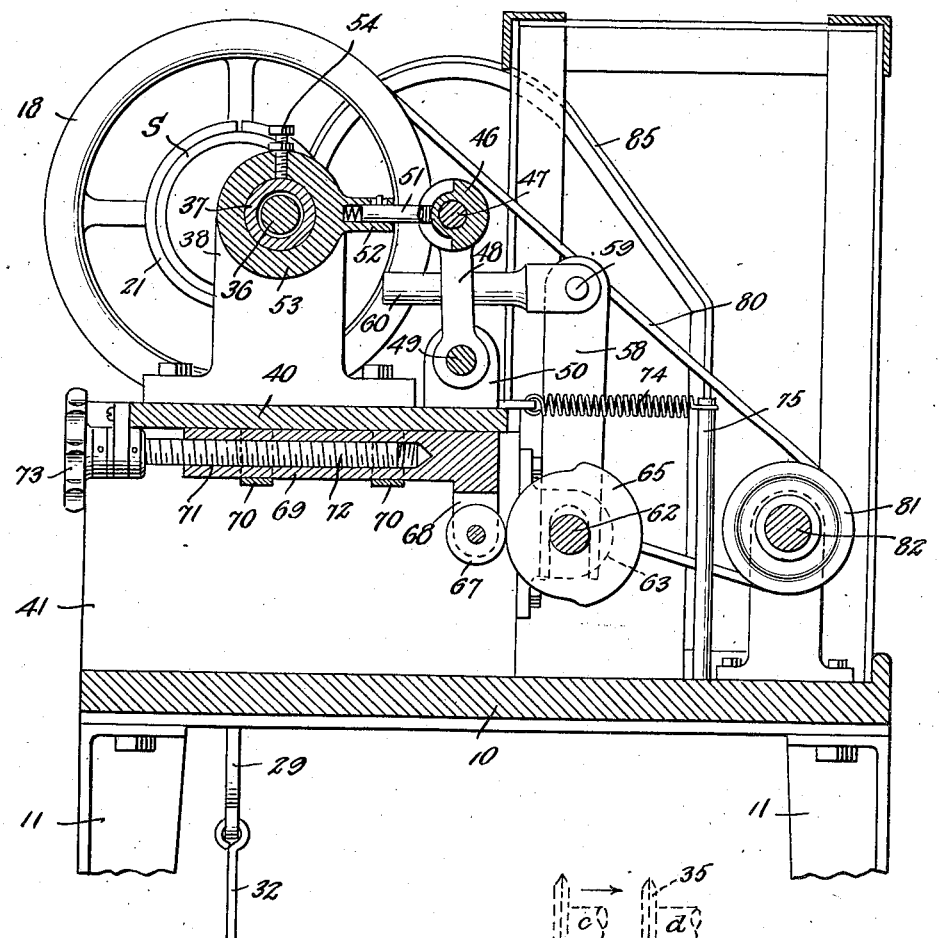
Fig. 4 is a similar view taken approximately on the line 4—4 of Fig. 1.

In use and operation of the machine, the tool 35, the chuck 21 and the cam and worm feed shafts 62 and 47 are continuously driven. The operator standing in front of the machine inserts the p ce of stock S to be threaded in the chuck 21 when the same is expanded by swinging the upper end 31 of the lever 29 to the right, by depressing the foot operated means 32. The piece of stock S is inserted while the chuck 21 is rotating thereby facilitating proper centering and positioning of the stock therein. This is accomplished while the tool 35 is in the retracted position shown in Figs. 1 and 2 of the drawings and immediately following the emplacement of the piece of stock in the chuck, the foot operated means 32 is released so that the spring 28 functions to shift the shaft 24 to the left to draw the frusto-conical boss 22 into contact with the frusto-conical chuck engaging face 17 to grip the stock for rotation with the chuck.

In the present illustration, the machine is set and illustrated for cutting an internal thread in the stock S. With the tool 35 in the retracted position illustrated in Fig. 1, immediately following the emplacement and gripping of the stock in the chuck 21, the cam 56 acting on the lift bar 58 rocks the bearing arms 48 to engage the worm wheel 46 with the worm finger 51. This feeds the tool 35 to the left across the inner periphery of the stock S, the combined translatory movement and rotation of the tool cutting a spiral groove or thread in the inner periphery of the stock. When the tool has completed the cutting of the thread in the stock, the cam 65 is so timed in its rotation as to shift the carriage 40 forwardly to thereby move the tool radially inward with reference to the stock to disengage its cutting edge from the stock periphery. Immediately following this, the cam 56 again actuates the lift bar 58 to swing or rock the worm feed wheel 46 to a position out of engagement with the cam finger 51. Upon disengagement of the worm wheel from the cam finger, the spring 55, acting upon the collar 53 shifts the tubular housing 37 and the tool 35 to the retracted position being arrested in its movement by the abutment of the collar 53 with the bearing 39, while the cam 65 permits the springs 74 to move the carriage rearwardly for a repetition of the cycle of operation.

It will be understood that immediately upon retraction of the tool, the operator removes the piece of stock which has been threaded and inserts a new piece of stock. Obviously, the tool 35 employed may be of any desired cross sectional shape to cut either a V-shaped thread as shown or any other shape desired, and within the scope of the invention the tool may be so shaped as to cut a multiple thread while the pitch of the thread may be varied by interchanging the worm wheel with others having different degrees of pitch. Also it is apparent that by turning the manipulating knob 73, the depth of the thread may be varied while the screw 72 is employed for initially setting the machine for the cutting operation. The cam 66 may be selectively brought into an active position with the cam roller 67 and the cam 65 moved to an inactive position when the machine is employed for cutting threads on the external periphery of the stock as it is found in practice that a greater extent of movement of the carriage is desirable when the threads are externally cut.

Figure 5:
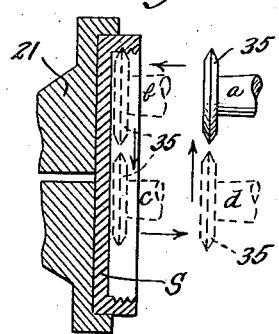
Fig. 5 is a diagrammatic view on a larger scale illustrating the various positions of the cutter with reference to the stock when cutting a thread on the inner periphery thereof.

In Fig. 5 of the drawings, the relative positions of the cutter 35 with reference to the stock S are illustrated, the position a showing the cutter in full lines in a position whereby upon axial movement in the direction indicated by the arrow the same will move across the inner periphery of the stock which is likewise rotating until it reaches the position b shown in dotted lines, this movement of the cutter being effected by the interengagement of the worm finger 51 with the worm 46.

After completion of the cutting of the desired number of convolutions of the thread, the cutter 35 is moved from the position b to the position c radially inward with reference to the stock and this movement is controlled by the cam 65 which effects the forward shifting or sliding movement of the carriage 40. It will be, of course, understood that the extent of the movement from the position a to the position b, while the cutter is in cutting engagement with the stock, is controlled by the length of time the low portion of the cam face engages with the cam roller 67. From the position c the tool 35 is retracted to the position d and this is accomplished by means of the spring 55 as soon as the cam 56 operates to swing the worm wheel 46 out of engagement with the worm finger 51. From the position d, the tool 35 is moved again to the position a by means of the springs 74 acting upon the carriage 40, shifting the same rearwardly as controlled by the face of the cam 65 and the cam roller 67. This places the tool in an axial line where, upon reengagement of the worm wheel 46 with the worm finger, the tool will be again moved from the position a to the position b repeating the operation.

Immediately following the retraction of the tool from the position c to the position d, it will be understood that the operator releases the chuck, removes the stock and inserts a new piece of stock for the threading operation.

Figure 6:
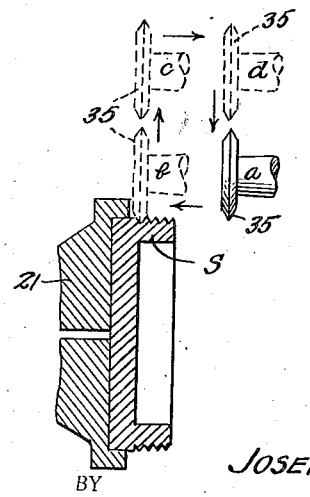
Fig. 6 is a similar view illustrating the relative positions of the cutter to the stock when cutting a thread on the exterior periphery of the stock.

In Fig. 6, the various positions of the tool during its cycle of movement, is illustrated where the machine is employed for cutting an outside thread. The only difference in this use is that from the position b to the position c, the tool is moved radially outward with reference to the stock and after retraction is moved radially inward with reference to the stock from the position d to the position a. In this instance, the cam 65 is moved out of position and the cam 66 is moved into position for contact with the cam roller 67, the cam 66 having a face which imparts to the carriage 40 a greater movement as it is immaterial how far away from the outer periphery the stock is moved to the position c whereas, when cutting internal threads, the radial inward movement is necessarily limited particularly where the threads are being cut on a piece of stock having a limited internal diameter.

What is claimed is:

1. In a thread cutting machine, a base, a continuously driven rotary stock holder having a fixed relation on said base, a carriage guidedly mounted on said base for lateral movement perpendicular to the axis of rotation of the stock and stock holder, a continuously driven rotary thread cutting tool having its axis of rotation disposed in a line parallel with the line of the axis of rotation of the stock holder, a non-rotary support for said tool slidably mounted on said carriage for moving the tool axially, interengageable means including a continuously driven worm and a worm engaging finger provided respectively on the carriage and tool support for feeding the tool across the periphery of the stock, interengageable cam means on the base and carriage for effecting lateral movement of the carriage to engage and disengage the tool with the periphery of the stock, cam means for engaging and disengaging the worm and worm engaging finger, and spring means for retracting the tool support when the worm and worm engaging finger are disengaged.

2. In a thread cutting machine, a base, a continuously driven rotary stock holder having a fixed relation on said base, a carriage guidedly mounted on said base for lateral movement perpendicular to the axis of rotation of the stock and stock holder, a continuously driven rotary thread cutting tool having its axis of rotation disposed in a line parallel with the line of the axis of rotation of the stock holder, a non-rotary support for said tool slidably mounted on said carriage for moving the tool axially, interengageable means including a continuously driven worm and a worm engaging finger provided respectively on the carriage and tool support for feeding the tool across the periphery of the stock, interengageable cam means on the base and carriage for effecting movement of the carriage to engage and disengage the tool with the periphery of the stock by radial movement of the tool with reference thereto, means for adjusting the carriage with reference to the cam means to initially position the tool with reference to the stock and to vary the depth of the thread to be cut, cam means for engaging and disengaging the worm and worm engaging finger, and spring means for retracting the tool support and tool when the worm and worm engaging finger are disengaged.

3. In a thread cutting machine, a continuously driven rotary stock holder normally fixed against axial movement and having manually releasable means for normally gripping the stock, a continuously driven rotary thread cutting tool, a non-rotary supporting sleeve for said tool, a carriage for said tool supporting sleeve having bearings in which said sleeve is mounted for axial sliding movement, said carriage being mounted for movement perpendicular to the axis of the tool and its supporting sleeve, interengageable means on the tool supporting sleeve and on the carriage comprising a worm and worm finger for feeding the tool across the periphery of the rotating stock and in thread cutting engagement therewith, cam means for moving the carriage perpendicular to the axis of the tool support to engage the tool with and disengage the same from the periphery of the stock, cam means operable to engage and disengage said worm and worm engaging finger, and spring means surrounding the tool supporting sleeve and adapted to retract said sleeve and tool when the worm finger is disengaged from the worm.

4. In a thread cutting machine, a continuously driven rotary stock holder normally fixed against axial movement and having manually releasable means for normally gripping the stock, a continuously driven rotary thread cutting tool, a non-rotary supporting sleeve for said tool, a carriage for said tool supporting sleeve having bearings in which said sleeve is mounted for axial sliding movement, said carriage being mounted for movement perpendicular to the axis of the tool and its supporting sleeve, interengageable means on the tool supporting sleeve and on the carriage comprising a worm and worm finger for feeding the tool across the periphery of the rotating stock and in thread cutting engagement therewith, one means for moving the carriage perpendicular to the axis of the tool support to engage the tool with and disengage the same from the periphery of the stock comprising a cam roller on the carriage adjustable with reference thereto, a fixed driven cam engageable with the roller, spring means for urging the carriage in a direction to engage the cam roller therewith, a second cam on said cam shaft operable to engage and disengage the worm and worm engaging finger, and spring means surrounding the tool supporting sleeve and adapted to retract said sleeve and the tool when the worm finger is disengaged from the worm.

JOSEPH LUPO, Jr.